US012616330B1

(12) United States Patent
   Peeler

(10) Patent No.: US 12,616,330 B1
(45) Date of Patent: May 5, 2026

(54) MANUAL ESPRESSO MACHINE

(71) Applicant: Christopher Peeler, El Segundo, CA (US)

(72) Inventor: Christopher Peeler, El Segundo, CA (US)

( * ) Notice: Subject to any disclaimer, the term of this patent is extended or adjusted under 35 U.S.C. 154(b) by 997 days.

(21) Appl. No.: 17/839,305

(22) Filed: Jun. 13, 2022

Related U.S. Application Data

(60) Provisional application No. 63/217,255, filed on Jun. 30, 2021.

(51) Int. Cl.
   *A47J 31/36* (2006.01)
   *A47J 31/38* (2006.01)
   *A47J 31/44* (2006.01)
   *A47J 31/52* (2006.01)

(52) U.S. Cl.
   CPC ........... *A47J 31/3671* (2013.01); *A47J 31/38* (2013.01); *A47J 31/446* (2013.01); *A47J 31/5251* (2018.08)

(58) Field of Classification Search
   CPC .... A47J 31/3671; A47J 31/5251; A47J 31/38; A47J 31/446
   USPC ................................... 99/285, 297
   See application file for complete search history.

(56) References Cited

U.S. PATENT DOCUMENTS

| 7,080,595 | B2 | 7/2006 | Babiel |
| 7,216,582 | B2 | 5/2007 | Yoakim |
| 7,478,584 | B2 | 1/2009 | Turi |

| 7,562,622 | B2 | 7/2009 | Babiel | |
| 8,752,477 | B2 | 6/2014 | Douma | |
| 10,182,678 | B2 * | 1/2019 | Landau | ............... A47J 31/0663 |
| 10,687,655 | B2 | 6/2020 | Brandsma | |
| 10,779,677 | B2 | 9/2020 | Nocera | |
| 10,881,243 | B2 | 1/2021 | Dionisio | |
| 10,905,276 | B2 | 2/2021 | Boubeddi | |
| 2005/0172818 | A1 | 8/2005 | Hunt | |
| 2007/0227363 | A1 | 10/2007 | Verna | |
| 2010/0086654 | A1 * | 4/2010 | Douma | ............... A47J 31/3609 99/288 |
| 2016/0227958 | A1 | 8/2016 | Zhao | |

(Continued)

FOREIGN PATENT DOCUMENTS

| AU | 2010101197 A4 | 1/2011 |
| CH | 303990 A | 12/1954 |

(Continued)

*Primary Examiner* — Elizabeth M Kerr
*Assistant Examiner* — Simpson A Chen
(74) *Attorney, Agent, or Firm* — QuickPatents; Kevin Prince

(57) ABSTRACT

An espresso press for forcing hot water through coffee grounds into a container rests on a support surface, and is comprised of a base, a stand projecting upwardly from the support surface, an arbor assembly, a brewhead that includes a brewhead mount fixed with the stand, and an espresso chamber adapted to receive filter baskets of various sizes. The arbor assembly is comprised of an arbor mount, and an arbor that includes a movable shaft the arbor aperture and a plunger slidably fixed with the shaft. The arbor assembly further includes a rack-and-pinion arrangement that includes a rack gear fixed with the shaft of the arbor, and a pinion gear partially projecting into the arbor aperture and adapted to engage the rack gear of the arbor when the arbor is fixed within the arbor aperture. The pinion gear is rotatable with a manual lever.

11 Claims, 8 Drawing Sheets

(56)　　　　　　　References Cited

U.S. PATENT DOCUMENTS

| | | |
|---|---|---|
| 2019/0290050 A1 | 9/2019 | Maltoni |
| 2019/0343324 A1 | 11/2019 | Rijskamp |
| 2020/0237135 A1 | 7/2020 | Kim |
| 2020/0260903 A1 | 8/2020 | Widmer |
| 2020/0359834 A1 | 11/2020 | Marchesan |

FOREIGN PATENT DOCUMENTS

| | | | |
|---|---|---|---|
| CH | 635740 | A5 | 4/1983 |
| CN | 203122128 | U | 8/2013 |
| CN | 108078386 | A | 5/2018 |
| CN | 108175275 | A | 6/2018 |
| CN | 111166173 | A | 5/2020 |
| EP | 2570058 | A1 | 3/2013 |
| EP | 2789275 | A1 | 10/2014 |
| EP | 3345517 | A1 | 7/2018 |
| EP | 3563730 | A1 | 11/2019 |
| EP | 3677155 | A1 | 7/2020 |
| FR | 1071540 | A | 9/1954 |
| FR | 2395730 | A2 | 1/1979 |
| GB | 728017 | A | 4/1955 |
| GB | 765801 | A | 1/1957 |
| GB | 834890 | A | 5/1960 |
| WO | 2013111128 | A1 | 8/2013 |
| WO | 2018098544 | A1 | 6/2018 |
| WO | 2019135194 | A1 | 7/2019 |

* cited by examiner

MANUAL ESPRESSO MACHINE

CROSS-REFERENCE TO RELATED APPLICATIONS

This application claims the benefit of U.S. Provisional Patent Application 63/217,255, filed on Jun. 30, 2021, incorporated herein by reference.

STATEMENT REGARDING FEDERALLY SPONSORED RESEARCH AND DEVELOPMENT

Not Applicable.

FIELD OF THE INVENTION

This invention relates to coffee brewing machines, and more particularly to manual espresso presses.

BACKGROUND

Typically, manual espresso presses and automatic espresso machines are designed to accept a single sized filter basket. Automatic espresso presses, however, often lack pressure feedback that matches the exact pressure of the brewhead. And often found in manual and automatic espresso presses, the pressure gauge is connected directly to the water system, which can lead to contamination of the pressure gauge and contamination of the coffee drink.

Therefore, there is a need for a device that has the benefits of both the automatic and manual espresso presses while avoiding the common downfalls. The needed device would have a pressure gauge that is secondarily connected to the water system, yet provide feedback that is matched to the exact pressure of the brewhead. Such a press should also be able to accept multiple different sized filter baskets. The present invention accomplishes these objectives.

SUMMARY OF THE INVENTION

The present device is an espresso press for forcing hot water through coffee grounds into a container. The present invention has the ability to produce and control the typical espresso pressure of the hot water from 7 to 10 bar. The espresso press rests on a support surface, and is comprised of a base adapted for resting on the support surface and for supporting the container. The press further includes a stand projecting upwardly from the support surface, and an arbor assembly. The arbor assembly is comprised of an arbor mount, and an arbor that includes a shaft which is movable within the arbor aperture of the arbor mount. The arbor assembly further includes a rack-and-pinion arrangement that includes a rack gear fixed with the shaft of the arbor, and a pinion gear partially projecting into the arbor aperture and adapted to engage the rack gear of the arbor when the arbor is fixed within the arbor aperture. The pinion gear is rotatable with a manual lever between a raised and a lowered position, corresponding to a raised position of the arbor and a lowered position of the arbor, respectively.

The arbor further includes a plunger slidably fixed with a bottom end of the shaft of the arbor and defines a first internal volume therebetween. The shaft further includes a conduit between the bottom end and a top end of the shaft, the conduit being in fluid communication with the first internal volume. The arbor further includes a pressure gauge at the top end of the shaft and is in fluid communication with the conduit.

The espresso press further includes a brewhead including a brewhead mount for fixing the brewhead with the stand between the base and the arbor assembly. An espresso chamber adapted to receive an espresso filter basket with an optional espresso chamber handle is further included, and is open at both a top end and a bottom end. A water cylinder is removably attached with the espresso chamber, the water cylinder also open at both top and bottom ends to define a second internal volume. The water cylinder is adapted for receiving hot water therein. The top end of the water cylinder is open and adapted to receive a piston therein, which is sealed against an inside wall of the cylinder.

When the stand is set upon the support surface, the container is set upon the base under the espresso chamber, the water cylinder is fixed with the espresso chamber with containing the hot water, the piston is inserted into the top end of the cylinder to position the cylinder under the plunger of the arbor assembly, and the lever is pulled from its raised position to its lowered position while observing the pressure gauge to ensure that the pressure within the first internal volume does not exceed a predetermined limit, such as 7 to 10 Bar. The plunger presses the piston down into the water cylinder to force the water through the coffee grounds and into the container.

The present invention has the benefits of both the automatic and manual espresso presses while avoiding the common downfalls. The device has a pressure gauge that is secondarily connected to the water system, and also provides feedback that is matched to the pressure of the brewhead. The press is also able to accept multiple different sized filter baskets. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
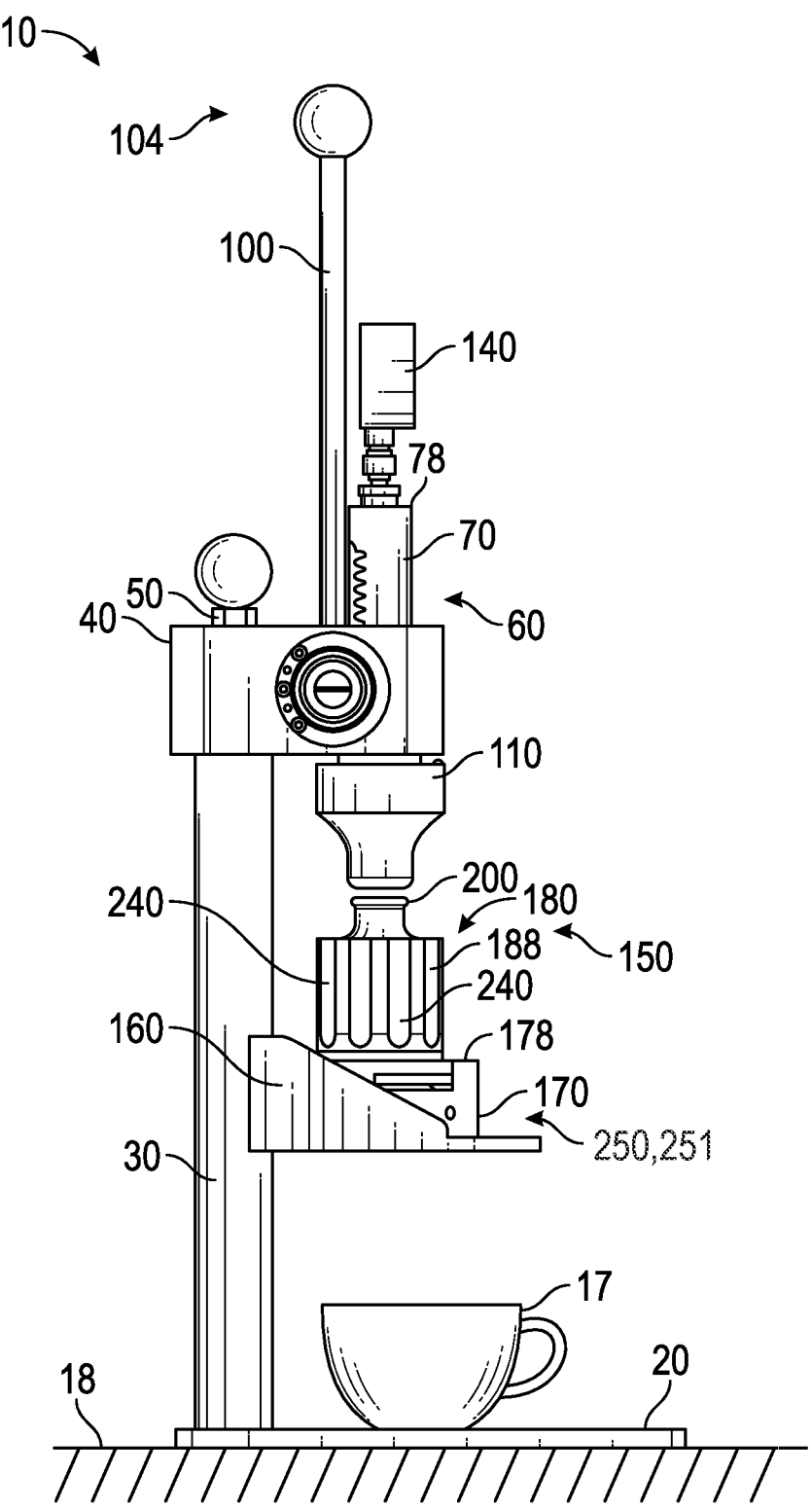
FIG. 1 is a side view of the espresso press in a raised position.
Figure 5:
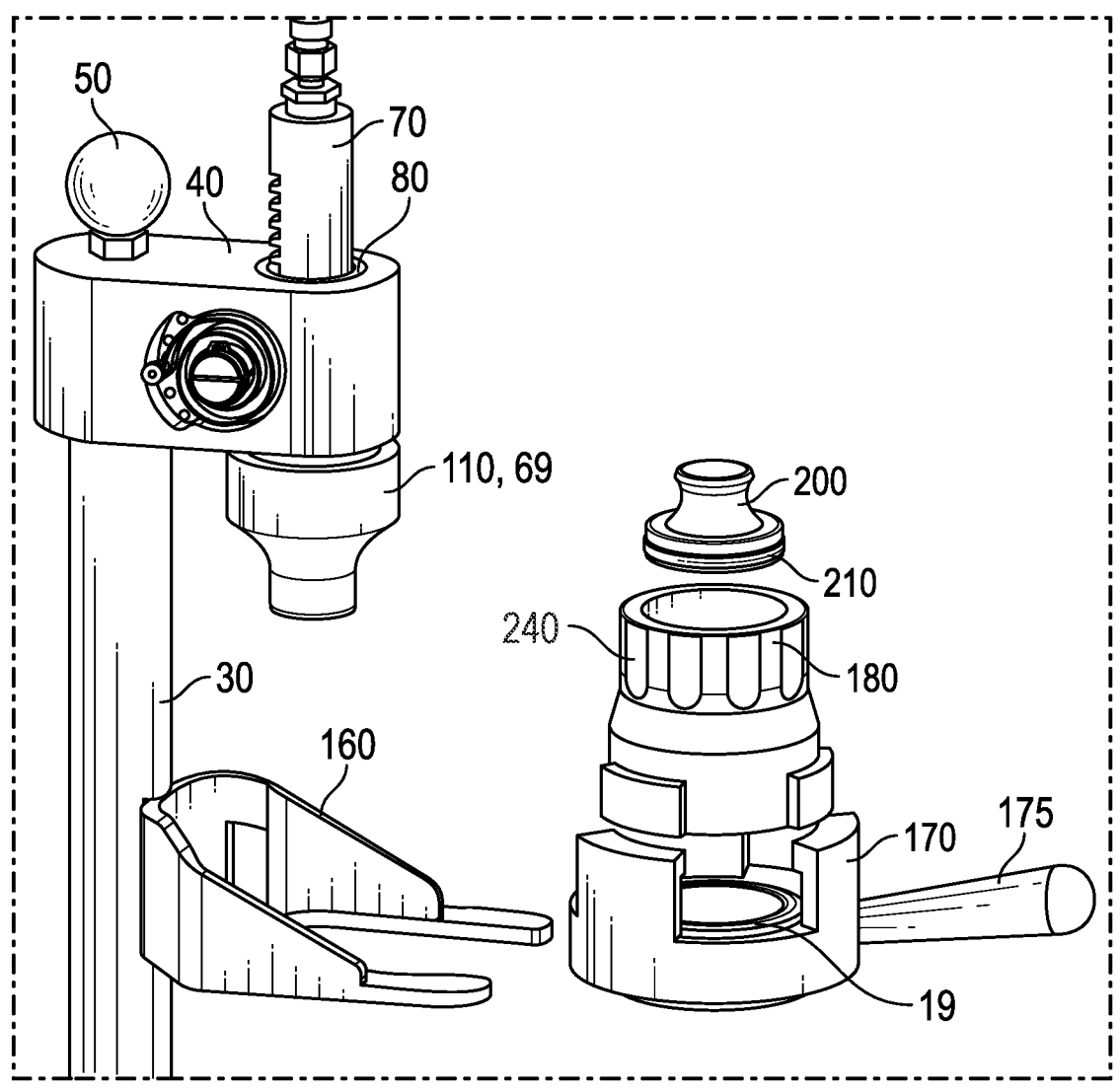
FIG. 5 is an exploded perspective view of FIG. 1.

FIGS. 1 and 5 illustrate an espresso press 10 for forcing hot water 15 through coffee grounds 16 into a container 17. The espresso press 10 rests on a support surface 18, and is comprised of a base 20 adapted for resting on the support surface 18 and for supporting the container 17. The press 10 further includes a stand 30 projecting upwardly from the support surface 18, and an arbor assembly 40.

The arbor assembly 40 is comprised of an arbor mount 50 and an arbor 60 that includes a shaft 70 which is movable within the arbor aperture 80 of the arbor mount 50. The arbor assembly 40 further includes a rack-and-pinion arrangement 90 that includes a rack gear 91 fixed with the shaft 70 of the arbor 60, and a pinion gear 92 partially projecting into the arbor aperture 80 and adapted to engage the rack gear 91 of the arbor 60 when the arbor 60 is fixed within the arbor aperture 80. The pinion gear 92 is rotatable with a manual lever 100 between a raised 109 and lowered position 101, corresponding to a raised position of the arbor 69 and a lowered position of the arbor 61, respectively.

The arbor 60 further includes a plunger 110 slidably fixed with a bottom end 72 of the shaft 70 of the arbor 60 and defines a first internal volume 120 therebetween. The shaft 70 further includes a conduit 130 between the bottom end 72 and a top end 78 of the shaft 70, the conduit 130 being in fluid communication with the first internal volume 120. The arbor 60 further includes a pressure gauge 140 at the top end 78 of the shaft 70 that is in fluid communication with the conduit 130.

Figure 2:
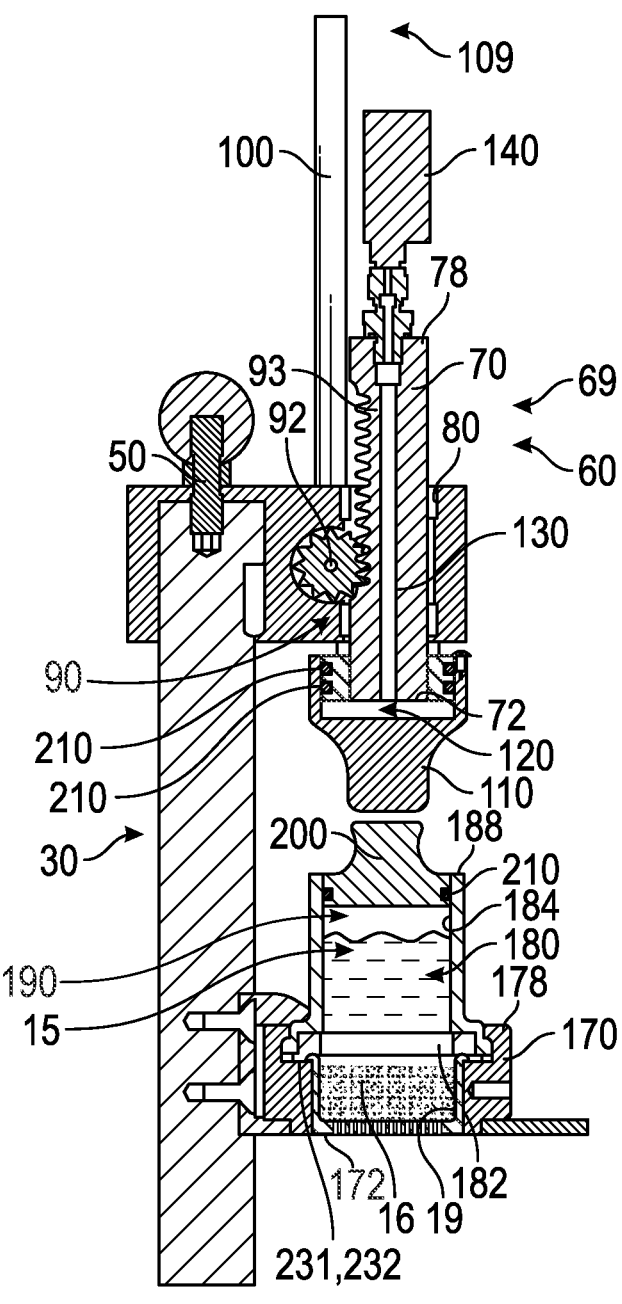
FIG. 2 is a cross section view of FIG. 1.
Figure 4:
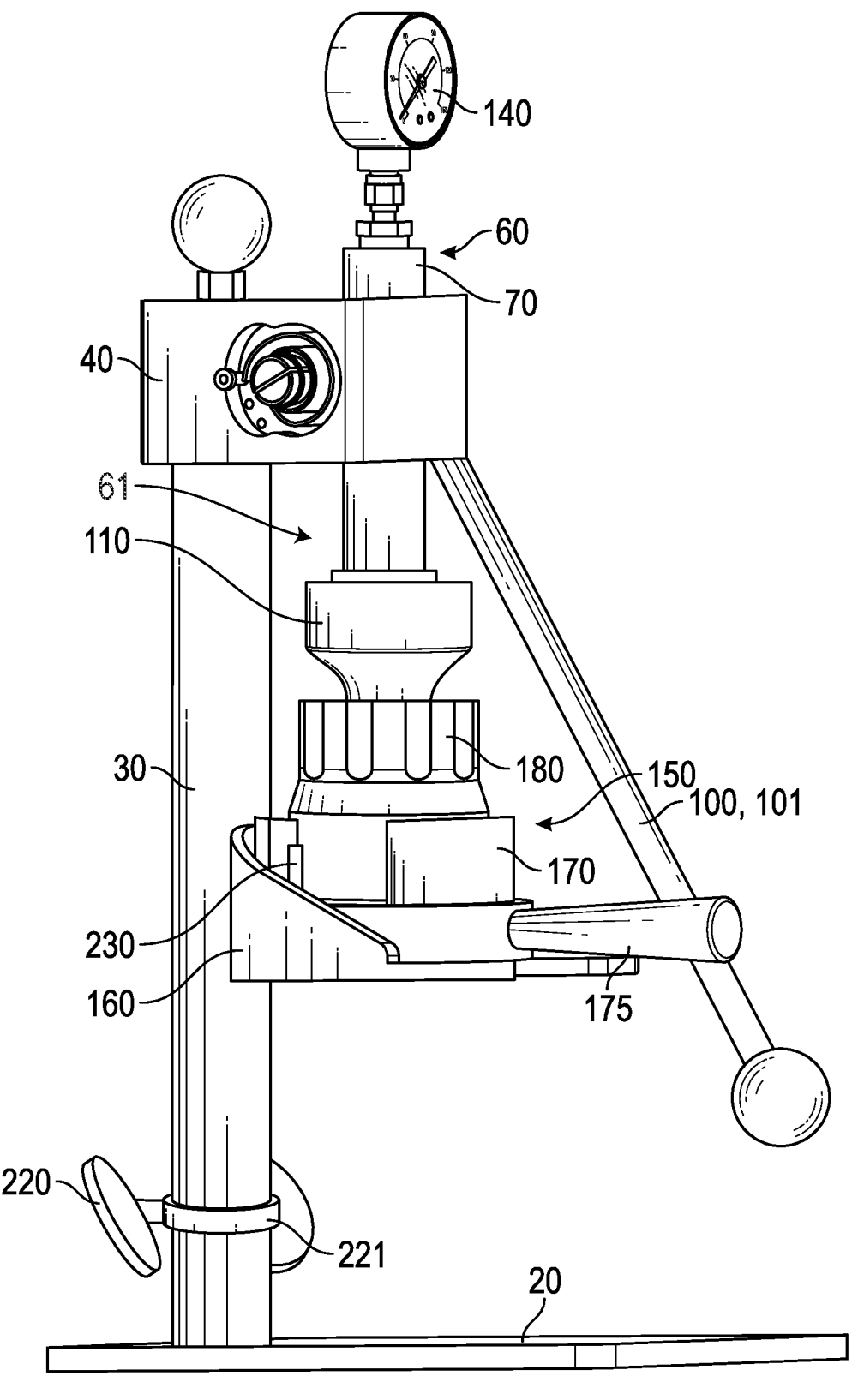
FIG. 4 is a perspective view of the espresso press in a lowered position.

The espresso press 10 further includes a brewhead 150 including a brewhead mount 160 for fixing the brewhead 150 with the stand 30 between the base 20 and the arbor assembly 40 (FIG. 4). An espresso chamber 170 adapted to receive an espresso filter basket 19 with an optional espresso chamber handle 175 is further included, and is open at both a top end 178 and a bottom end 172. A water cylinder 180 is removably attached with the espresso chamber 170, the water cylinder 180 also open at both top 188 and bottom ends 182 to define a second internal volume 190. The water cylinder 180 is adapted for receiving hot water 15 therein. The top end of the water cylinder 188 is open and adapted to receive a piston 200 therein after the hot water 15 has been poured into the water cylinder 180, is the piston 200 being sealed against an inside wall 184 of the cylinder (FIG. 2).

With the stand 30 is set upon the support surface 18, the container 17 set upon the base 20 under the espresso chamber 170, the water cylinder 180 being fixed with the espresso chamber 170 and containing the hot water, the piston 200 is inserted into the top end of the cylinder 188 to position the cylinder 180 under the plunger 110 of the arbor assembly 40. The lever 100 is pulled from its raised position 109 to its lowered position 101 while observing the pressure gauge 140 to ensure that the pressure within the first internal volume 120 does not exceed a predetermined limit, such as 7 to 10 Bar. The plunger 110 presses the piston 200 down into the water cylinder 180 to force the hot water 15 through the coffee grounds 16 and into the container 17.

The espresso press 10 preferably further includes at least one elastomeric O-ring 210 on the plunger 110 between the plunger 110 and the bottom end of the shaft 72, wherein the first internal volume 120 is sealed to the ambient atmosphere. There may also be another of the elastomeric O-rings 210 on the piston 200 between the piston 200 and the inside wall of the water cylinder 180, wherein the second internal volume 190 is sealed to the ambient atmosphere, except through the coffee grounds 16.

The espresso press 10 is preferably adapted to receive a 53 mm or a 58 mm espresso filter basket 19 therein. Further, a scale (not shown) can be included between the container 17 and the base 20 to weigh the espresso within the container 17. The base 20, arbor assembly 40, arbor mount 50, brewhead mount 160, espresso chamber 170, water cylinder 180, and piston 200 are all preferably made from a strong FDA plastic material, but can also be made with a milled or cast aluminum or other metallic material. A stainless steel filter mesh disc (not shown) can be used to compress the top of the coffee grinds 16, as is well known.

Figure 3:
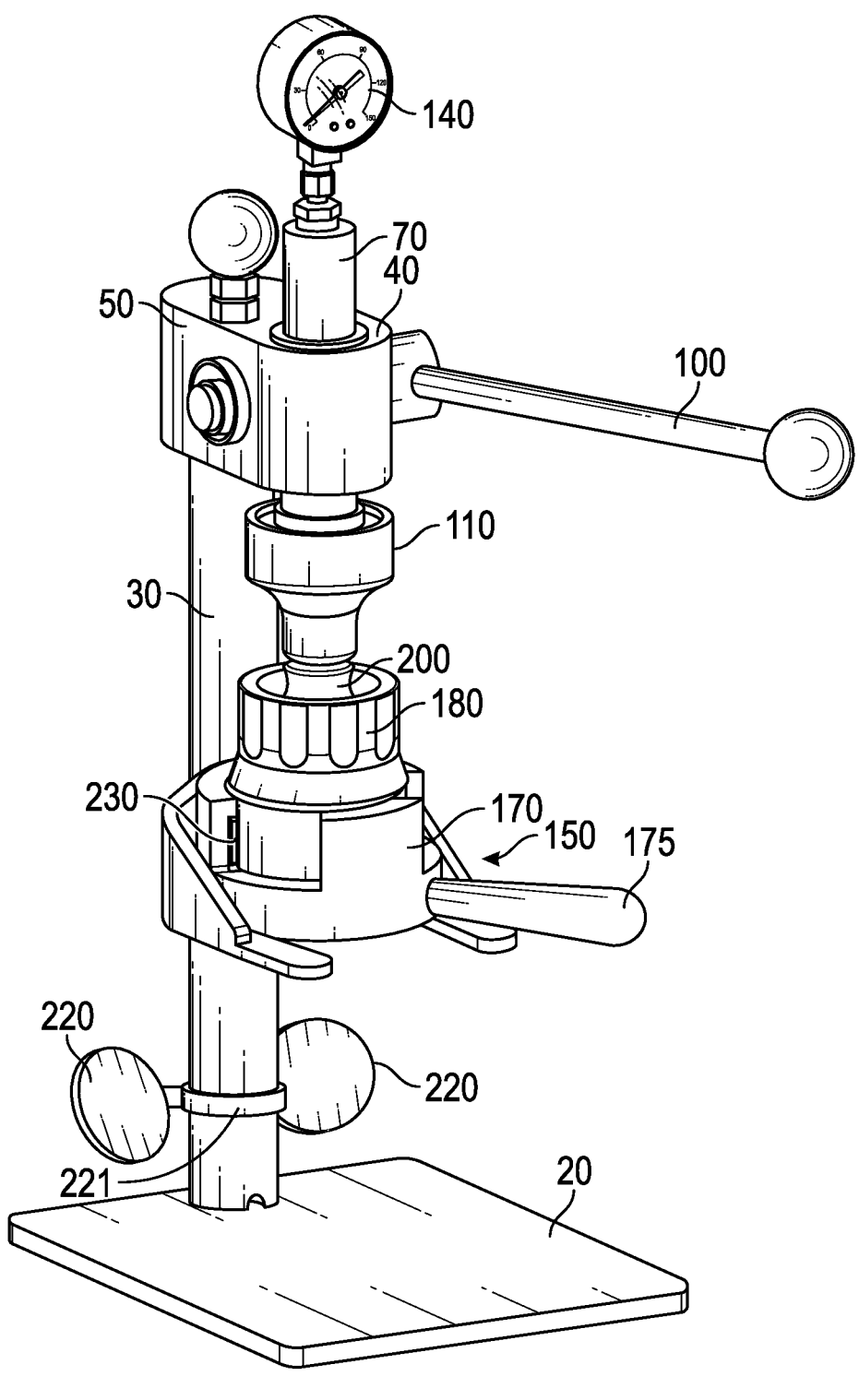
FIG. 3 is a top perspective view of an embodiment FIG. 1.

The espresso press 10 may further include one or two upwardly-facing mirror 220 projecting away from the brewhead 150, the mirror 220 providing a reflected image of the espresso pouring from the filter basket 19 when the lever 100 is manually pulled down (FIG. 3). A spring clip 221 may be included for selectively positioning the one or two mirrors 220 on the stand 30, for example.

Figure 7:
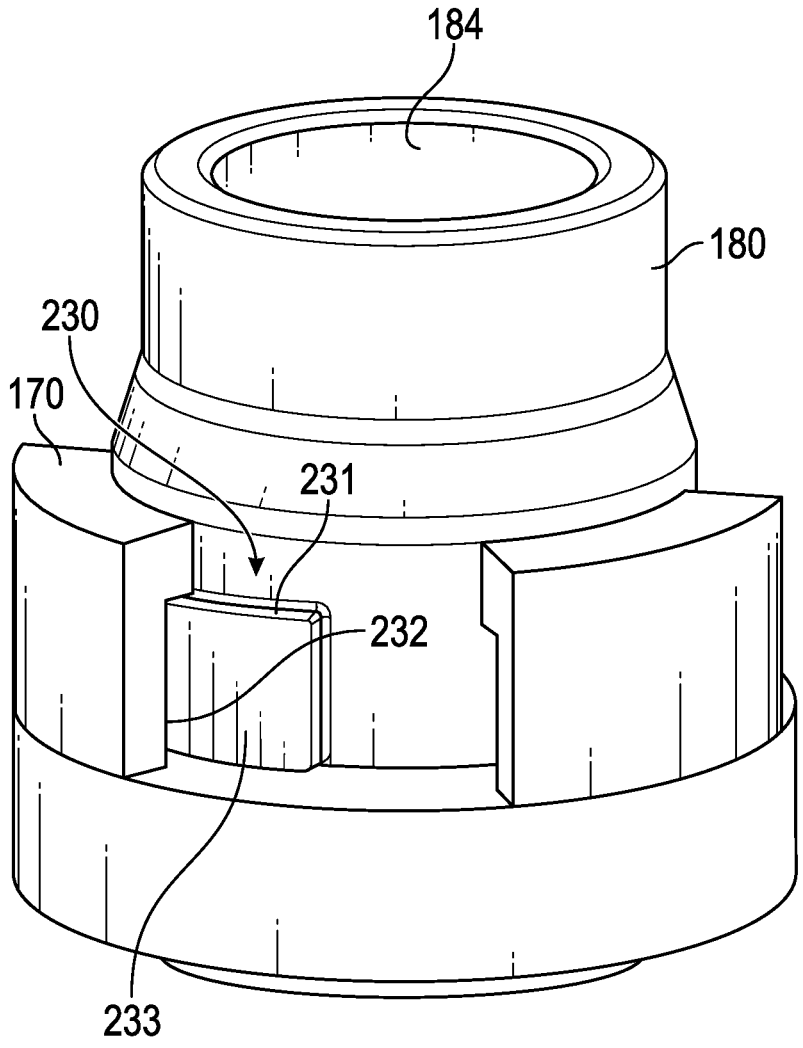
FIG. 7 is a perspective view of the espresso chamber.
Figure 8:
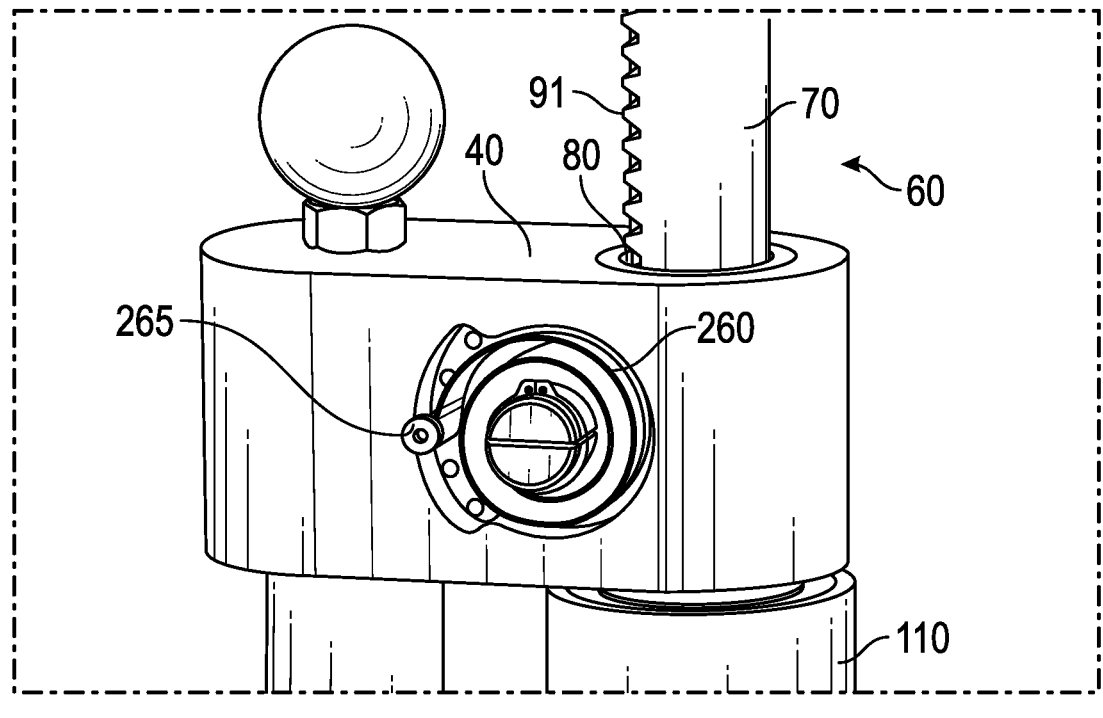
FIG. 8 is an enlarged perspective view of a preferred embodiment of the arbor assembly.

Further, the water cylinder 180 and the espresso chamber 170 may include a twist-lock arrangement 230 (FIG. 7) with an elastomeric seal 231, groove 232, and tab 233, whereby the water cylinder 180 is mounted to the espresso chamber 170 by dropping the water cylinder 180 into the espresso chamber 170 and twisting the water cylinder 180 to compress the elastomeric seal 231, whereby water pressed through the coffee grounds 16 is forced to exit the brewhead 150 through the coffee grounds 16 and out of the filter basket 19 (FIGS. 4,7). The brewhead may further include a support surface 250 with the espresso chamber 170 on the support surface 250 to allow the espresso chamber 170 to slide between rearward 251 (FIG. 1) and forward positions 252 (FIG. 1), whereby the espresso chamber 170 is loaded when in the forward position 252 with the espresso filter basket 19, coffee grounds 16, the water cylinder 180, the hot water, and the piston 200, and then the espresso chamber 170 is slid into the rearward position 252 below the plunger 110 of the arbor assembly 40 (FIG. 1-4). The arbor assembly 40 may further include a spring 260, which preferably includes a spring-tension adjustment prong 265, for urging the lever 100 into the raised position 109 (FIG. 8).

Figure 6:
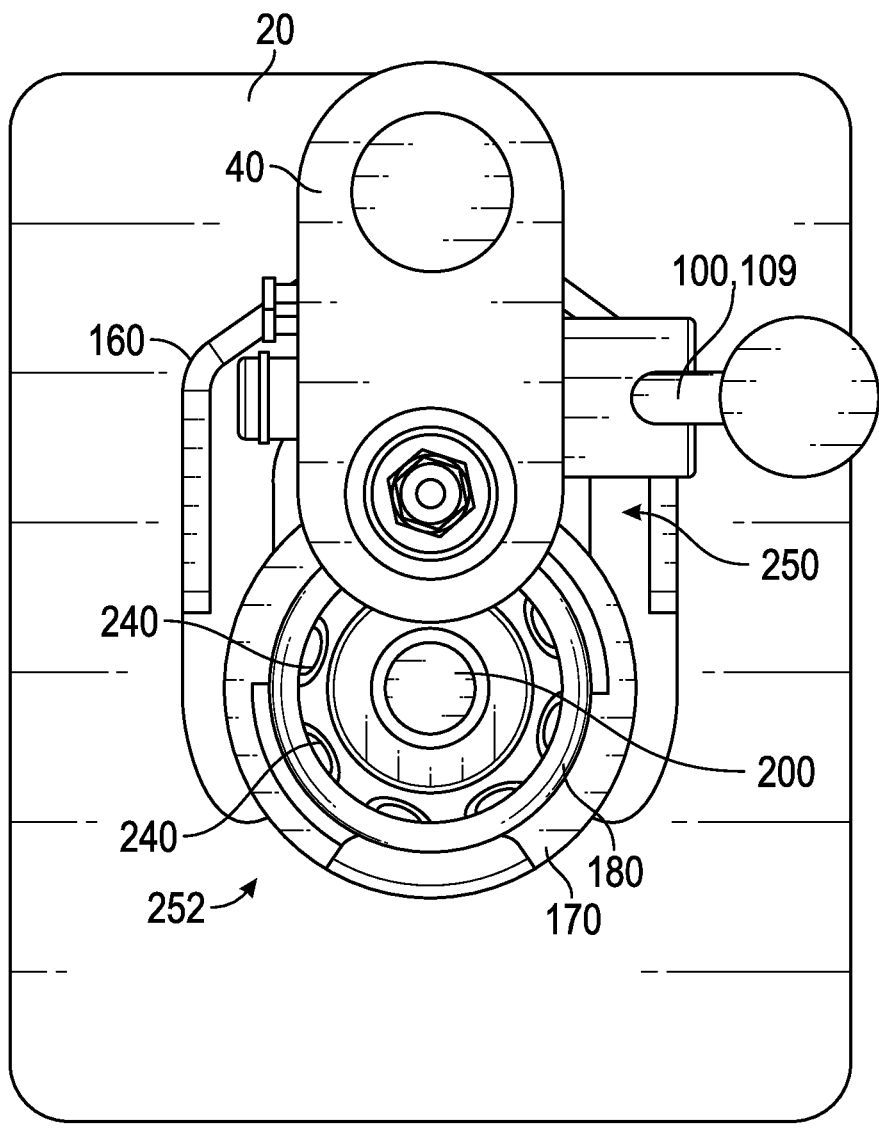
FIG. 6 is a top view thereof.

Further, an outside surface 188 of the water cylinder 180 may further include ribs 240 (FIGS. 1 and 6) for facilitating the gripping of and twisting of the water cylinder 180 within the twist-lock arrangement 230 of the espresso chamber 170.

While a particular form of the invention has been illustrated and described, it will be apparent that various modifications can be made without departing from the spirit and scope of the invention. For example, the figures display an espresso press 10 situated for producing a single serving of espresso. However the claimed design may also be utilized for multiple simultaneous servings, utilizing multiple containers. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms.

Accordingly, the inventor reserves the right to add additional claims after filing the application to pursue such additional claim forms for other aspects of the invention.

What is claimed is:

1. An espresso press for forcing hot water through coffee grounds into a container, the espresso press resting on a support surface and comprising:

a base adapted for resting on the support surface and for supporting the container;

a stand projecting upwardly from the support surface;

an arbor assembly comprising an arbor mount and an arbor that includes a shaft movable within an arbor aperture of the arbor mount, the arbor assembly further including a rack-and-pinion arrangement that includes a rack gear fixed with the shaft of the arbor, and a pinion gear partially projecting into the arbor aperture and adapted to engage the rack gear of the arbor when the arbor is fixed within the arbor aperture, the pinion gear rotatable with a manual lever between a raised and a lowered position corresponding to a raised position of the arbor and a lowered position of the arbor, respectively;

the arbor further including a plunger slidably fixed with a bottom end of the shaft of the arbor and defining a first internal volume therebetween, the shaft including a conduit between the bottom end and a top end of the shaft, the conduit in fluid communication with the first internal volume, the arbor further including a pressure gauge at the top end of the shaft and in fluid communication with the conduit;

a brewhead includes a brewhead mount for fixing the brewhead with the stand between the base and the arbor assembly, an espresso chamber adapted to receive an espresso filter basket, the espresso chamber open at top and bottom ends thereof, and a cylinder removably attached with the espresso chamber, open at top and bottom ends thereof to define a second internal volume therein, and adapted for receiving the hot water therein, the top end of the cylinder open and adapted to receive a piston therein, sealed against an inside wall of the cylinder;

whereby with the stand set upon the support surface, the container set upon the base under the espresso chamber, the coffee grounds held within the espresso filter basket within the espresso chamber, the cylinder fixed with the espresso chamber and containing the hot water, the piston is inserted into the top end of the cylinder to position the cylinder under the plunger of the arbor assembly, whereby the lever is pulled from its raised position to its lowered position while observing the pressure gauge to ensure that the pressure within the first internal volume does not exceed a predetermined limit, the plunger pressing the piston down into the cylinder to force the water through the coffee grounds and into the container.

2. The espresso press of claim 1 further including at least one elastomeric O-ring on the plunger between the plunger and the bottom end of the shaft, wherein the first internal volume is sealed to the ambient atmosphere.

3. The espresso press of claim 1 further including at least one elastomeric O-ring on the piston between the piston and the inside wall of the cylinder, wherein the second internal volume is sealed to the ambient atmosphere but through the coffee grounds.

4. The espresso press of claim 1 wherein the espresso chamber is adapted to receive a 53 mm espresso filter basket therein.

5. The espresso press of claim 1 wherein the espresso chamber is adapted to receive a 58 mm espresso filter basket therein.

6. The espresso press of claim 1 wherein the brewhead further includes an upwardly-facing mirror projecting away from the brewhead, the mirror providing a reflected image of espresso pouring into the container from the filter basket when manually pulling down the lever.

7. The espresso press of claim 1 wherein the cylinder and the espresso chamber include a twist-lock arrangement with an elastomeric seal, whereby the cylinder is mounted to the espresso chamber by dropping the cylinder into the espresso chamber and twisting the cylinder to compress the elastomeric seal, whereby water pressed through the coffee grounds is forced to exit the brewhead through the coffee grounds and out of the bottom end of the espresso chamber.

8. The espresso press of claim 7 wherein an outside surface of the cylinder includes ribs for facilitating the gripping of and twisting of the cylinder within the twist-lock arrangement of the espresso chamber.

9. The espresso press of claim 1 wherein the brewhead includes a track, the espresso chamber slidably fixed with the track to allow the espresso chamber to slide between rearward and forward positions, whereby the espresso chamber is loaded when in the forward position with the espresso filter basket, coffee grounds, the cylinder, the hot water, and the piston, and then the espresso chamber is slid into the rearward position below the plunger of the arbor assembly.

10. The espresso press of claim 1 wherein the arbor assembly further includes a spring adapted for urging the manual lever into the raised position.

11. An espresso press for forcing hot water through coffee grounds into a container, the espresso press resting on a support surface and comprising:

a base adapted for resting on the support surface and for supporting the container;

a stand projecting upwardly from the support surface;

an arbor assembly comprising an arbor mount and an arbor that includes a shaft movable within an arbor aperture of the arbor mount, the arbor assembly further including a rack-and-pinion arrangement that includes a rack gear fixed with the shaft of the arbor, and a pinion gear partially projecting into the arbor aperture and adapted to engage the rack gear of the arbor when the arbor is fixed within the arbor aperture, the pinion gear rotatable with a manual lever between a raised and a lowered position corresponding to a raised position of the arbor and a lowered position of the arbor, respectively, the arbor assembly further including a spring for urging the manual lever into the raised position;

the arbor further including a plunger slidably fixed with a bottom end of the shaft of the arbor and defining a first internal volume therebetween, the shaft including a conduit between the bottom end and a top end of the shaft, the conduit in fluid communication with the first internal volume, the arbor further including a pressure gauge at the top end of the shaft and in fluid communication with the conduit;

a brewhead includes a brewhead mount for fixing the brewhead with the stand between the base and the arbor assembly, an espresso chamber adapted to receive an espresso filter basket, the espresso chamber open at top and bottom ends thereof, and a cylinder removably attached with the espresso chamber, open at top and bottom ends thereof to define a second internal volume therein, and adapted for receiving the hot water therein, the top end of the cylinder open and adapted to receive a piston therein, sealed against an inside wall of the cylinder;

the cylinder and the espresso chamber including a twist-lock arrangement with an elastomeric seal, wherein the cylinder is mounted to the espresso chamber by dropping the cylinder into the espresso chamber and twisting the cylinder to compress the elastomeric seal, water pressed through the coffee grounds being forced to exit the brewhead through the coffee grounds and out of the bottom end of the espresso chamber, an outside surface of the cylinder includes ribs for facilitating the gripping of and twisting of the cylinder within the twist-lock arrangement of the espresso chamber;

the brewhead including a track, the espresso chamber slidably fixed with the track to allow the espresso chamber to slide between rearward and forward positions, wherein the espresso chamber is loaded when in the forward position with the espresso filter basket, coffee grounds, the cylinder, the hot water, and the piston, and then the espresso chamber is slid into the rearward position below the plunger of the arbor assembly;

at least one elastomeric O-ring fixed between the plunger and the bottom end of the shaft, wherein the first internal volume is sealed to the ambient atmosphere;

at least one elastomeric O-ring fixed between the piston and the inside wall of the cylinder, wherein the second internal volume is sealed to the ambient atmosphere but through the coffee grounds;

whereby with the stand set upon the support surface, the container set upon the base under the espresso chamber, the coffee grounds held within the espresso filter basket within the espresso chamber, the cylinder fixed with the espresso chamber and containing the hot water, the piston is inserted into the top end of the cylinder to position the cylinder under the plunger of the arbor assembly, whereby the lever is pulled from its raised position to its lowered position while observing the pressure gauge to ensure that the pressure within the first internal volume does not exceed a predetermined limit, the plunger pressing the piston down into the cylinder to force the water through the coffee grounds and into the container.

\* \* \* \* \*